Sept. 9, 1947.                R. J. BASKERVILLE ET AL                2,427,181
                    COMBINED FUSE AND CIRCUIT INTERRUPTING DEVICE
                              Filed April 28, 1943
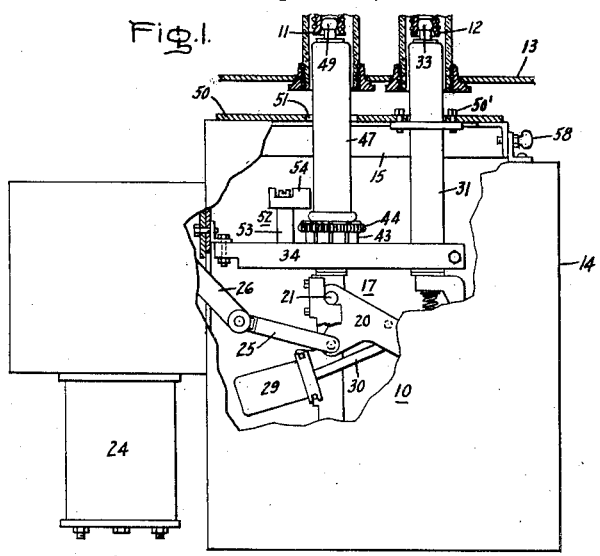
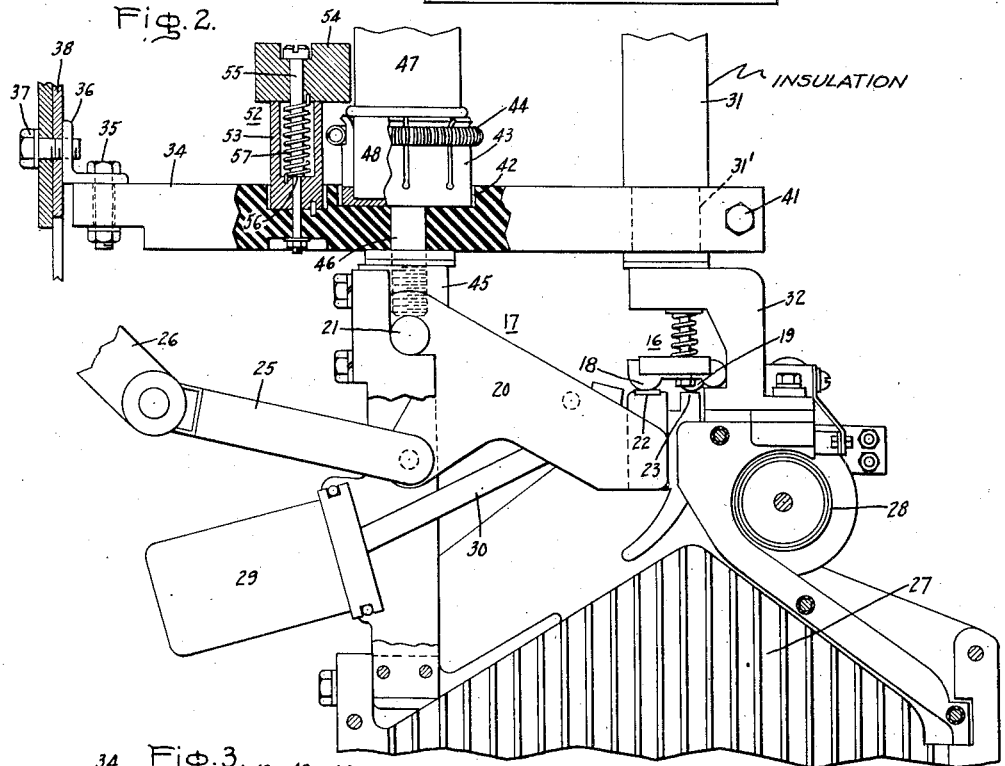
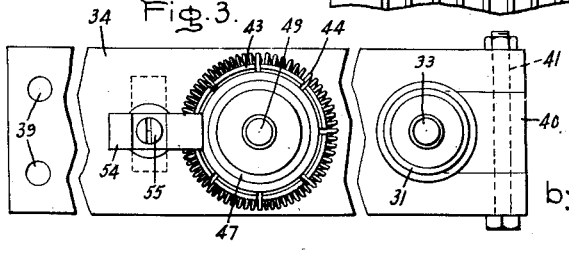
Inventors:
Ralph J. Baskerville,
Ralph R. Bush,
by Harry E. Dunham
Their Attorney.

Patented Sept. 9, 1947

2,427,181

UNITED STATES PATENT OFFICE 2,427,181

COMBINED FUSE AND CIRCUIT INTERRUPTING DEVICE

Ralph J. Baskerville, Merwood Park, and Ralph R. Bush, Oakmont, Pa., assignors to General Electric Company, a corporation of New York Application April 28, 1943, Serial No. 484,832

7 Claims. (Cl. 200—114)

Our invention relates to circuit interrupting devices, and more particularly, to a circuit interrupter which includes as a part of its physical structure a second circuit interrupter preferably of the type including a fusible element. Specifically, our invention is an improvement on copending application Serial No. 435,464, Strang, Reed, and Linde, filed March 20, 1942, now U. S. Patent No. 2,385,658, and assigned to the same assignee as the present application.

It is an object of our invention to provide a new and improved circuit interrupting device in which a circuit interrupter includes as a part of its physical structure a second circuit interrupter electrically in series with the first mentioned circuit interrupter.

It is another object of our invention to provide a new and improved flexibly mounted shockproof conductor stud for an electric circuit breaker.

It is a further object of our invention to provide new and improved means for flexibly supporting and retaining a circuit breaker conductor stud in its operative position, the stud constituting a fuse element for protecting the circuit breaker from excessive short circuit overloads.

Further objects and advantages of our invention will become apparent as the following description proceeds, and the features of novelty which characterize our invention will be pointed out with particularity in the claims annexed to and forming a part of this application.

For a better understanding of our invention, reference may be had to the accompanying drawing in which Fig. 1 is a side elevational view with cutaway portions of a well-known type of standard air circuit breaker embodying our invention, constructed for use with metal clad switchgear of the vertical lift type; Fig. 2 is an enlarged detailed view partly in section of a portion of the air circuit breaker of Fig. 1; and Fig. 3 is a view looking down at the top of Fig. 2 assuming the breaker protective housing is removed.

As is also true of the above mentioned Strang, Reed, and Linde patent, it will be obvious that our invention is applicable to many different types of circuit breakers. It is, however, particularly applicable to switchgear commonly referred to as metal clad switchgear which comprises a stationary enclosing structure into which electric power circuits are connected, which power circuits are controlled by a cooperating electric circuit breaker mounted on a removable unit which may be of the vertical lift or the horizontal draw-out type. Movement of the unit including the circuit breaker into position in the stationary enclosure connects the circuit interrupting device with an associated power circuit through primary disconnecting devices which usually comprise stationary portions in the enclosing structure and cooperating conductor studs on the removable unit including the circuit breaker.

In the drawings, and particularly with reference to Fig. 1, we have illustrated our invention as applied to a circuit breaker of the vertical lift type which is also referred to as the "drop-down" type, wherein disconnection of the circuit breaker from the associated circuit is effected merely by bodily lowering the removable unit and associated circuit breaker. The circuit breaker illustrated in the drawings is in some respects very similar to the circuit breaker disclosed and claimed in the copending application of Leonard J. Linde, Serial No. 435,463, filed March 20, 1942, now Patent 2,335,068, and assigned to the same assignee as the present application.

The air circuit breaker unit of Figs. 1 and 2 generally indicated at 10, is in a form that is particularly adaptable for central stations and substations wherein the unit can be bodily disconnected with respect to the stationary circuits comprising the stationary portions 11 and 12 of the primary disconnecting contacts by a simple plugging operation. The stationary portions 11 and 12 of the primary disconnecting contacts comprise well-known resilient "tulip" type contacts adapted to receive the spherical terminals of the conductor studs of the circuit breaker and are suitably mounted in a metal clad enclosing structure 13, only a very small portion of which is shown in Fig. 1. The removable unit 10 is encased in a protective housing which is constituted by a strong supporting frame 15 to which is removably secured an insulating box barrier 14 and which, in the case of a triple pole breaker, is usually provided with interphase segregating barriers. This removable encased unit 10 is arranged within the grounded enclosing structure 13 for raising or lowering into or out of engagement with the terminal contacts 11 and 12 of the associated electric circuit to be controlled. More specifically the circuit breaker unit 10 of Figs. 1 and 2 comprises a main supporting frame 15 for the movable contact structure which comprises a fixed or stationary contact structure 16 and a movable contact structure 17. The stationary contact structure 16 includes a current carrying contact 18 and an arcing contact 19. The movable contact structure comprises a pivotally mounted contact supporting arm 20 pivotally mounted at 21. Arm 20 supports a current carrying contact 22 and an arcing contact 23.

Relative movement between contacts 18 and 22 for example, is obtained through the operation of any suitable actuating mechanism, such as 24 in Fig. 1 carried by the supporting frame 15, which may be of the solenoid type, for example. The actuating mechanism 24 is interconnected in any suitable manner with movable contact supporting arm 20, as for example, by a link 25 and a crank 26. Upon relative separation of the movable and stationary contact structure, the current carrying contacts 18 and 22 first separate to transfer the current to arcing contacts 19 and 23 and the arc drawn between these contacts is forced into an arc chute indicated at 27 by means of a magnetic blowout coil 28. In case of weak arc currents, the action of the blowout coil 28 may be supplemented by a "booster" or the like for directing an air jet across the arc as it is initially formed. Such means can comprise a cylinder 29 having mounted therein a piston (not shown) connected to a hollow piston rod 30 so that upon operation of the circuit breaker a jet of air is directed against the arc. This "booster" arrangement is specifically disclosed and claimed in United States Letters Patent 2,280,616, granted April 21, 1942, upon an application of R. J. Baskerville and assigned to the same assignee as the present application.

The arrangement described thus far is not our invention, but is disclosed and claimed in the aforesaid Linde patent.

The stationary contact structure 16 is electrically connected by suitable means 32 to the lower end of a conductor stud within bushing 31 which is suitably supported by the upper framework 15 of removable unit 10. The upper end of conductor stud within bushing 31 comprises a spherical male contact portion 33 which forms the movable portion of the primary disconnecting devices or contacts adapted to electrically engage the stationary flexible contact 12 thereof suitably and insulatingly mounted in metal clad housing 13 as shown in Fig. 1. It should be understood that the major portion of the exterior of bushing 31 is constructed of insulating material to insulate its axial electrical conductor stud from the strong metal supporting frame 15.

In order to support the pivot 21 for movable contact arm 20, we provide an insulating brace or support 34 having one portion or end thereof suitably fastened as by bolts 35 to an angle member 36 also suitably fastened as indicated at 37 to the vertical framework member 38 which may be a portion of frame 15 of removable unit 10. In order to firmly attach insulating support or brace 34 to the angle member 36, two openings 39 (Fig. 3) are provided for two fastening means such as bolts 35. Another portion or the other end of insulating brace or support 34, is supported by being clamped to the lower end of bushing 31 which has a portion of reduced cross-section indicated at 31'. Insulating support 34 includes a removable portion 40 (Fig. 3) so that the support is provided with a forked end to surround in clamping relation the portion 31' of bushing 31, after which the portion 40 is replaced and suitable clamping means such as a bolt 41 is provided to securely clamp support 34 to bushing 31.

Mounted in a recess 42 intermediate the ends of insulating support 34 is a flexible terminal 43 which is preferably cylindrical in form to engage the lower contact ferrule or terminal of a current limiting fuse as will become apparent from the following description. Flexible terminal 43 has been illustrated as an annular spring type contact member including a garter spring 44. A suitable conducting member 45 which supports pivot 21 of contact-controlling arm 20 is electrically connected to terminal 43 and mechanically supported from brace 34 as by means of a threaded member 46 which may be suitably welded to terminal 43 and threadedly engaged with conducting member 45. Flexible terminal 43 is adapted to be removably electrically connected to the lower end of a bushing 47 which not only serves as a conductor stud but actually comprises a current limiting fuse which is preferably of the form and construction disclosed and claimed in copending application Serial No. 484,842, Strang and Powell, filed concurrently herewith and assigned to the same assignee as the present application. This current limiting fuse comprises an insulating casing and is generally of the type shown in United States Letters Patent 2,188,816—Rankin, which is provided at the lower end thereof with a conducting terminal or ferrule 48 adapted to be inserted in flexible terminal 43 and to electrically engage therewith. The upper end of current limiting fuse hereinafter termed "fuse bushing" 47 terminates in a spherical contact 49 very similar to contact 33 of bushing 31 which forms the movable portion of the primary disconnecting contact, the stationary portion of which is indicated at 11.

We have illustrated the current limiting fuse bushing 47 flexibly attached to the circuit breaker so as to be self-aligning in that it is supported only at its lower end by the flexible terminal 43 when the unit 10 is disconnected from structure 13. The upper end of the fuse bushing 47 is therefore free to center itself in the stationary tulip contact 11 of the primary disconnecting contact as the breaker unit 10 is raised toward the metal clad structure 13. It will be evident that when the breaker 10 assumes its upper operative position the fuse bushing 47 is supported floatingly at its extremities by the resilient engagement of its terminals in the flexible socket contacts 43 and 11 respectively. In this way strain is avoided on the bushing, particularly if its insulating body be ceramic or if it is a current limiting fuse link within a glass or other frangible type fuse tube. However, the maximum misalignment of fuse bushing 47 is controlled by a top plate 50 which is mounted on the top of frame 15 and is provided with an opening 51 somewhat larger than fuse bushing 47. The inside edge of clearance opening 51 circumscribes the range of flexibility of fuse bushing 47 within suitable limits so that, as the removable unit 10 is being raised into operative position, the spherical terminal 49 will readily engage the bell mouth of its cooperating resilient fixed contact 11 with no danger of stubbing.

The bushing 31, securely bolted as at 50' by its supporting flange to the top plate 50 of frame 15, constitutes a structurally strong member, for it may comprise a sturdy central copper stud encased in and reinforced by an insulating body of densely wrapped bonded paper or cloth compound, so that it is well constituted for anchoring the insulating supporting brace 34 thereto. Conversely the brace 34, bolted securely at its other end to the breaker frame structure, effectively reinforces the bushing 31 against cantilever stress. Their combination affords a very effective supporting structure for both the pivot member 45 against which the breaker operating forces react most severely and for the contact 48 which flexibly supports the fuse bushing 47 or, in certain desirable cases, a fuseless insulated conductor stud of the same general external configuration as fuse bushing 47.

Since a certain amount of friction is involved between the movable and stationary portions of the primary disconnecting contacts, in order to secure good electrical contact, it is possible that upon lowering the removable unit 10 so as to cause disengagement of the primary disconnecting contacts, that fuse bushing 47 might be disengaged from terminal 43 instead of from the stationary portion 11 of the primary disconnecting devices. This would be undesirable and consequently we provide a suitable latching means generally indicated at 52 which comprises a stationary base 53 and a movable top piece 54. The two parts 53 and 54 are assembled together and attached to insulating brace or support 34 as by means of a bolt 55 provided with a shoulder 56. This latching means 52 is mounted in such a position on brace 34 that the top piece 54 engages the contact ferrule or lower terminal 48 of fuse bushing 47, thereby preventing it from being removed from terminal 43 during the interval when the circuit breaker is lowered and the primary disconnecting devices or contacts are disengaged in the metal clad equipment. The normal position of the top piece 54 of latch means 52 is indicated in the drawings. However, it is possible to rotate the top piece 54 against the torque of a small torsion spring 57 located in base 53 so as to clear the lower fuse terminal 48. This position of latching means 52 is indicated in dotted lines in Fig. 3. With the arrangement described above it will be obvious that fuse bushing 47 may be readily removed for replacement after an excessive current interrupting operation has blown the fuse while, on the other hand, accidental removal of fuse bushing 47 from terminal 43 is prevented.

Access to latching means 52 may be had by the removal of enclosing box barrier 14 after the removal of suitable thumb screws or fastening means such as 58.

Although we have disclosed our invention as applied to a circuit breaker in which only two conductor studs are visible which might be a single phase circuit breaker, it will be obvious that it might equally well be applied to a polyphase circuit breaker such as a three-phase circuit breaker in which case six conductor studs would be provided.

From the above discussion it will be obvious that we have provided a circuit interrupting device which includes as a physical part thereof a second circuit interrupting device serially arranged therewith insofar as the electrical circuit is concerned. The main circuit interrupting device operates as a conventional circuit breaker unit, but in the event of fault currents greater than those which the circuit breaker can satisfactorily interrupt the second circuit interrupter becomes effective to interrupt the current. By this arrangement a very compact structure is provided, having all the advantages of a separate and serially connected current limiting fuse and circuit interrupting device. Moreover, improved means have been provided for supporting the fuse unit in an effectively shock-resistant manner within the breaker unit.

While we have disclosed certain specific embodiments of our invention, it should be understood that our invention is not limited to the specific details and construction thereof herein illustrated and we intend in the appended claims to cover all such changes and modifications as fall within the true spirit and scope of our invention.

What we claim as new and desire to secure by Letters Patent of the United States is:

1. In an electric circuit interrupter, a housing, a pair of relatively movable contacts mounted in said housing for controlling the current flowing in an associated electric circuit, a conductor stud supported by and extending from said housing electrically connected to one of said relatively movable contacts, a support for the other of said contacts in said housing having one portion thereof fastened to said housing, while another portion is clamped to said conductor stud, an electric terminal mounted on said support and electrically connected to the other of said relatively movable contacts, and a second conductor stud extending from said housing comprising a fuse removably connected to said terminal to permit ready replacement thereof.

2. In an electric circuit interrupter, a housing, a pair of relatively movable contacts mounted in said housing for controlling the current flowing in an associated electric circuit, a conductor stud supported by and extending from said housing electrically connected to one of said relatively movable contacts, a support for the other of said contacts in said housing having one portion thereof fastened to said housing, while another portion is clamped to said conductor stud, a cylindrical electric terminal mounted on said support and electrically connected to the other of said relatively movable contacts, and a second conductor stud extending from said housing comprising a fuse including a lower ferrule adapted to be removably connected to said terminal to permit ready replacement thereof.

3. In an electric circuit interrupter, a housing, a pair of relatively movable contacts mounted in said housing for controlling the current flowing in an associated electric circuit, a conductor stud supported by and extending from said housing electrically connected to one of said relatively movable contacts, a support for the other of said contacts in said housing having one portion thereof fastened to said housing, while another portion is clamped to said conductor stud, an electric terminal mounted on said support and electrically connected to the other of said relatively movable contacts, a second conductor stud extending from said housing comprising a fuse removably connected to said terminal to permit ready replacement thereof, and means for preventing accidental disengagement of said fuse from said terminal.

4. In an electric circuit interrupter, a housing, a pair of relatively movable contacts mounted in said housing for controlling the current flowing in an associated electric circuit, a conductor stud supported by and extending from said housing electrically connected to one of said relatively movable contacts, a support for the other of said contacts in said housing having one portion thereof fastened to said housing, while another portion is clamped to said conductor stud, an electric terminal mounted on said support and electrically connected to the other of said relatively movable contacts, a second conductor stud extending from said housing comprising a fuse removably connected to said terminal to permit ready replacement thereof, and means mounted on said support for preventing accidental disengagement of said fuse from said terminal.

5. In an electric circuit interrupter, a housing, a pair of relatively movable contacts mounted in said housing for controlling the current flowing in an associated electric circuit, a conductor stud supported by and extending from said housing electrically connected to one of said relatively movable contacts, an insulating support for the other of said contacts in said housing having one end thereof fastened to said housing, while the other end is clamped to said conductor stud, an electric terminal mounted on said support and electrically connected to the other of said relatively movable contacts, and a second conductor stud extending from said housing comprising a fuse removably connected to said terminal to permit ready replacement thereof, said second conductor stud being mounted flexibly in said terminal for limited movement at its other end.

6. In a circuit breaker of the removable type for use with an associated stationary structure provided with a pair of terminal disconnecting contacts, the combination of a housing, a pair of relatively movable contacts, insulated mounting means for said contacts disposed within said housing, a pair of conductor studs electrically connected to and extending from said relatively movable contacts through apertures in a wall of said housing, each stud having its projecting outer end adapted for resilient engagement with one of said terminal disconnecting contacts respectively, the first of said pair of conductor studs being secured fixedly to said housing wall and to said contact mounting means, and flexible means for supporting the inner end of the second conductor stud at said contact mounting means so that when said circuit breaker and its associated structure are operatively connected said second stud is floatingly supported between one of said disconnecting terminal contacts and said flexible means.

7. In a circuit breaker of the removable type for use with an associated stationary structure provided with a pair of terminal disconnecting contacts, the combination of a housing, a pair of relatively movable contacts, insulated mounting means for said contacts disposed within said housing, a pair of conductor studs electrically connected to and extending from said relatively movable contacts through apertures in a wall of said housing, each stud having its projecting outer end adapted for resilient engagement with one of said terminal disconnecting contacts respectively, the first of said pair of conductor studs being secured fixedly to said housing wall and to said contact mounting means, flexible disconnectable means for supporting the inner end of the second conductor stud at said contact supporting means so that when said circuit breaker and its associated structure are operatively connected said second stud is floatingly supported between one of said disconnecting terminal contacts and said flexible disconnectable means, and means for causing the preferential disconnection of said second stud from said disconnecting terminal contact when said circuit breaker is moved away from its said associated structure.

RALPH J. BASKERVILLE.
RALPH R. BUSH.

REFERENCES CITED

The following references are of record in the file of this patent:

UNITED STATES PATENTS

| Number | Name | Date |
|---|---|---|
| 2,161,571 | Harvey | June 6, 1939 |
| 2,124,269 | Anderson et al. | July 19, 1938 |
| 1,601,926 | Simpson | Oct. 5, 1926 |
| 2,129,723 | Wood | Sept. 13, 1938 |
| 2,176,718 | Linde | Oct. 17, 1939 |
| 1,654,475 | Wyman | Dec. 27, 1927 |
| 1,531,917 | French | Mar. 31, 1925 |
| 2,190,952 | Rossman | Feb. 20, 1940 |

FOREIGN PATENTS

| Number | Country | Date |
|---|---|---|
| 273,370 | Great Britain | June 30, 1927 |